United States Patent
Cremonesi et al.

(10) Patent No.: US 9,350,627 B2
(45) Date of Patent: May 24, 2016

(54) AUTOMATED SERVICE TIME ESTIMATION METHOD FOR IT SYSTEM RESOURCES

(71) Applicant: Caplan Software Development S.r.l., Milan (IT)

(72) Inventors: Paolo Cremonesi, Milan (IT); Kanika Dhyani, Milan (IT); Stefano Visconti, Brenta (IT)

(73) Assignee: BMC SOFTWARE, INC., Houston, TX (US)

( * ) Notice: Subject to any disclaimer, the term of this patent is extended or adjusted under 35 U.S.C. 154(b) by 639 days.

(21) Appl. No.: 13/650,767

(22) Filed: Oct. 12, 2012

(65) Prior Publication Data

US 2013/0103826 A1    Apr. 25, 2013

Related U.S. Application Data

(63) Continuation of application No. PCT/IB2011/051648, filed on Apr. 15, 2011.

(30) Foreign Application Priority Data

Apr. 15, 2010  (WO) .................. PCT/IT2010/000164

(51) Int. Cl.
| | |
|---|---|
| *G06F 15/173* | (2006.01) |
| *H04L 12/26* | (2006.01) |
| *G06Q 10/06* | (2012.01) |
| *G06F 11/34* | (2006.01) |

(52) U.S. Cl.
CPC ............ *H04L 43/04* (2013.01); *G06F 11/3452* (2013.01); *G06Q 10/06* (2013.01)

(58) Field of Classification Search
USPC ....................................................... 709/224
See application file for complete search history.

(56) References Cited

U.S. PATENT DOCUMENTS

| 2004/0111508 A1* | 6/2004 | Dias ........................ H04L 29/06 709/224 |
| 2007/0088532 A1* | 4/2007 | Alvarez ............... G05B 13/042 703/2 |

OTHER PUBLICATIONS

International Search Report and Written Opinion received for Patent Application No. PCT/IT2010/000164, mailed on Dec. 30, 2010, 9 pages.
International Search Report and Written Opinion received for Patent Application No. PCT/IB2011/051648, mailed on Aug. 19, 2011, 12 pages.

(Continued)

*Primary Examiner* — Kevin Bates
*Assistant Examiner* — Sm Rahman
(74) *Attorney, Agent, or Firm* — Brake Hughes Bellermann LLP

(57) ABSTRACT

Embodiments provide a method for upgrading resources in a system including normalizing a collected dataset, scattering data from the normalized dataset, obtaining a plurality of clusters based on the scattered data, discarding one or more clusters from the plurality of clusters with less than a percentage of a total number of observations, in each cluster, performing clusterwise regression and obtaining linear sub-clusters in a defined number, reducing one or more sub-clusters including applying a refinement procedure, removing one or more sub-clusters that fit to outliers and merging pairs of clusters that fit an equivalent model, updating one or more clusters with the reduced sub-clusters, removing one or more globular clusters, reducing a number of clusters with the refinement procedure, and de-normalizing one or more results.

10 Claims, 14 Drawing Sheets

Strongly and weakly-assigned observations

(56) References Cited

OTHER PUBLICATIONS

International Preliminary Report on Patentability received for Patent Application No. PCT/IT2010/000164, issued on Oct. 16, 2012, 6 pages.

International Preliminary Report on Patentability received for Patent Application No. PCT/IB2011/051648, issued on Oct. 16, 2012, 9 pages.

Cremonesi et al., "Service Time Estimation with a Refinement Enhanced Hybrid Clustering Algorithm", Proceedings of the 17th international conference on Analytical and stochastic modeling techniques and applications, Feb. 2010, pp. 291-305.

Casale et al., "Robust Workload Estimation in Queueing Network Performance Models", Euromicro Conference on Parallel, Distributed and Network-Based Processing, Feb. 13-15, 2008, pp. 183-187.

Ester et al., "A density-based algorithm for discovering clusters in large spatial databases with noise", Proceedings of 2nd International Conference on Knowledge Discovery and Data Mining, Jan. 1, 1996, pp. 226-231.

Fekri et al., "Robust weighted orthogonal regression in the errors-in-variables model", Journal of Multivariate Analysis Volume, 88 No. 1, Jan. 1, 2004, pp. 89-108.

Rousseeuw, P. J., "Least Median of Squares Regression", Journal of the American Statistical Association, vol. 79, No. 388, Dec. 1984, pp. 871-880.

Huber, P. J., "Robust Regression: Asymptotics, Conjectures and Monte Carlo", Ann. Statist., vol. 1, No. 5, 1973, pp. 799-821.

Rousseeuw, J. P., "Silhouettes: a graphical aid to the interpretation and validation of cluster analysis", Journal of Computational and Applied Mathematics archive, vol. 20 No. 1, Nov. 1987, pp. 53-65.

Rousseeuw et al., "Fast Algorithm for the Minimum Covariance Determinant Estimator", Dec. 15, 1998, 31 pages.

Caporossi et al., "Variable Neighborhood search for least squares clusterwise regression", Dec. 2007, 15 pages.

Cremonesi et al., "Service Time Estimation with a Refinement Enhanced Hybrid Clustering Algorithm", Proceedings of the 17th international conference on Analytical and stochastic modeling techniques and applications, Jun. 14, 2010, pp. 291-305.

\* cited by examiner

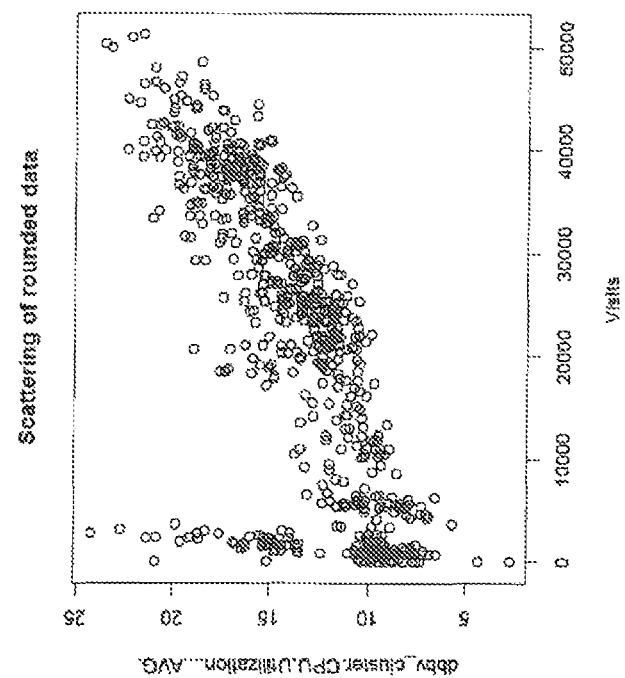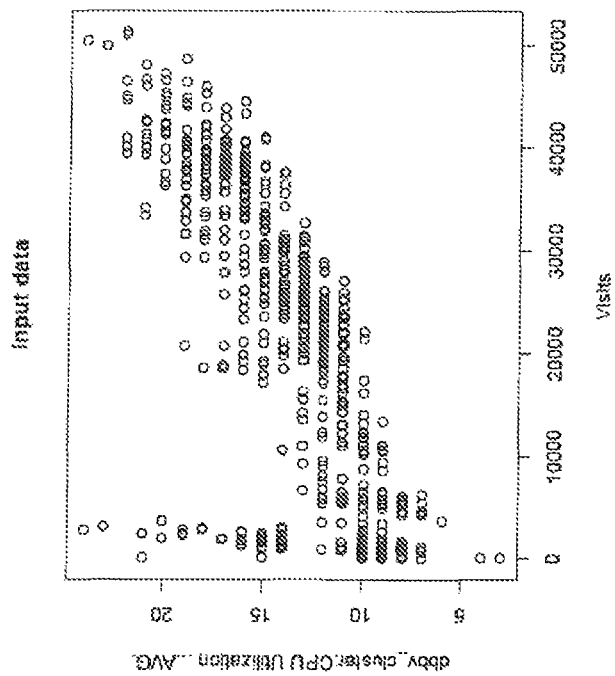
Fig. 2

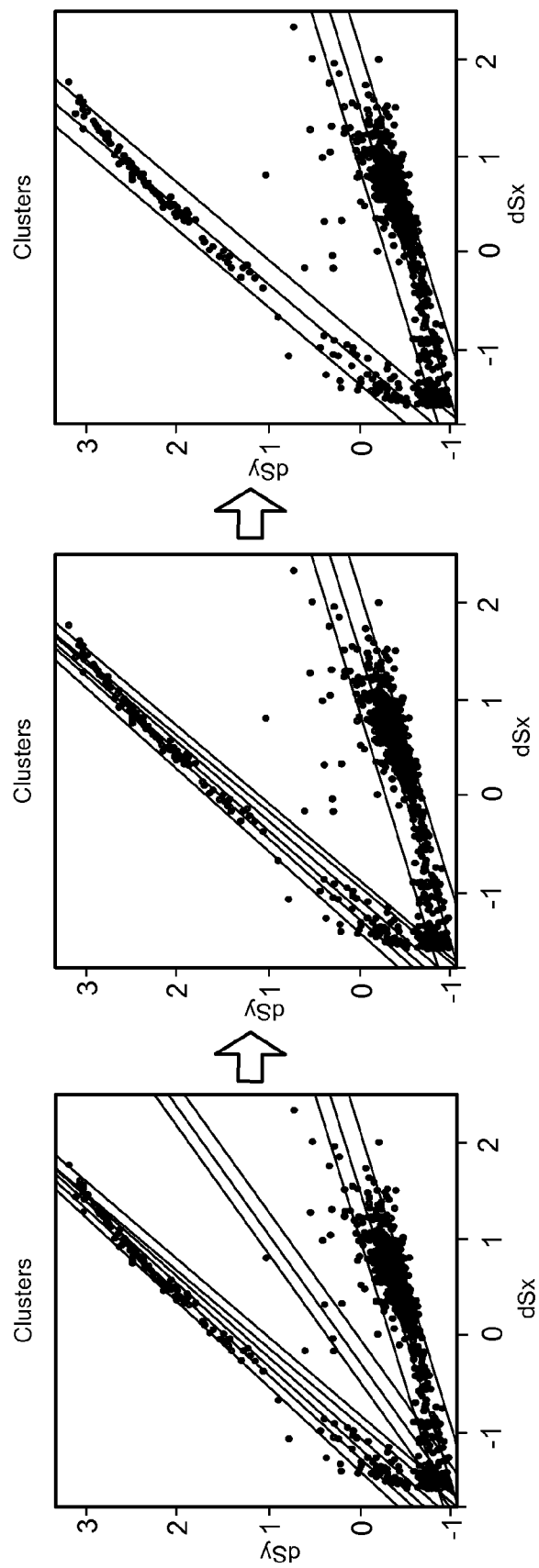

Strongly and weakly-assigned observations

| Test | Clusters | Cluster size | $X$ | Slope | Intercept | $\epsilon$ | $\eta$ |
|---|---|---|---|---|---|---|---|
| 1 | 3 | 1000 | $\mathcal{N}$ | 0.5 | 10 | $\mathcal{N}(0,0.5)$ | $Exp(1)$ |
|   |   | 100  | $\mathcal{N}$ | 2.5 | 20 | $\mathcal{N}(0,0.5)$ | $Exp(1)$ |
|   |   | 100  | $\mathcal{N}$ | 4   | 30 | $\mathcal{N}(0,0.5)$ | $Exp(1)$ |
| 2 | 2 | 500  | $\chi^2$ | 10 | 0  | $\mathcal{N}(0,0.5)$ | $\mathcal{N}(0,2)$ |
|   |   | 100  | $\chi^2$ | 2  | 50 | $\mathcal{N}(0,0.5)$ | $\mathcal{N}(0,2)$ |
| 3 | 3 | 300  | $\mathcal{N}$ | 4 | 10  | $\mathcal{N}(0,1)$ | $t(3)$ |
|   |   | 300  | $\mathcal{N}$ | 2 | 10  | $\mathcal{N}(0,1)$ | $t(3)$ |
|   |   | 300  | $\mathcal{N}$ | 2 | 400 | $\mathcal{N}(0,1)$ | $t(3)$ |
| 4 | 3 | 400  | $\mathcal{U}$ | 1 | 5 | $\mathcal{N}(0,1)$ | $t(3)$ |
|   |   | 400  | $\mathcal{U}$ | 3 | 5 | $\mathcal{N}(0,1)$ | $t(3)$ |
|   |   | 400  | $\mathcal{U}$ | 5 | 5 | $\mathcal{N}(0,1)$ | $t(3)$ |
| 5 | 3 | 50   | $\chi^2$ | 1.5 | 6 | $\mathcal{N}(0,0.3)$ | $\mathcal{N}(0,0.5)$ |
|   |   | 50   | $\chi^2$ | 0.9 | 3 | $\mathcal{N}(0,0.3)$ | $\mathcal{N}(0,0.5)$ |
|   |   | 50   | $\chi^2$ | 0.3 | 1 | $\mathcal{N}(0,0.3)$ | $\mathcal{N}(0,0.5)$ |
| 6 | 2 | 500  | $\mathcal{N}$ | 0 | 0 | $\mathcal{N}(0,1)$ | $\mathcal{N}(0,1)$ |
|   |   | 500  | $\mathcal{N}$ | 1 | 0 | $\mathcal{N}(0,1)$ | $\mathcal{N}(0,1)$ |

Fig. 13

Linear Grouping Algorithm vs Hybrid Linear Clustering: parameters of the synthetic data sets.

| Test Case | Metric | LGA | HLC |
|---|---|---|---|
| T1 | Correct K | 0.90 | 0.98 |
| | Slope accuracy | 0.828168 | 0.997198 |
| T2 | Correct K | 0.28 | 0.96 |
| | Slope accuracy | 0.99993 | 0.999096 |
| T3 | Correct K | 0.00 | 1.00 |
| | Slope accuracy | - | 0.996370 |
| T4 | Correct K | 0.82 | 0.98 |
| | Slope accuracy | 0.9999979 | 0.9999966 |
| T5 | Correct K | 0.12 | 0.86 |
| | Slope accuracy | 0.969904 | 0.999103 |
| T6 | Correct K | 1.00 | 1.00 |
| | Slope accuracy | 0.993515 | 0.999794 |

AUTOMATED SERVICE TIME ESTIMATION METHOD FOR IT SYSTEM RESOURCES

PRIORITY STATEMENT

This application is a continuation application of and claims priority under 35 U.S.C. §120 to PCT application No. PCT/IB2011/051648 filed Apr. 15, 2011, which claims priority to PCT application No. PCT/IT2010/000164 filed Apr. 15, 2010. PCT application No. PCT/IB2011/051648 and PCT application No. PCT/IT2010/000164 are incorporated herein by reference in their entity.

FIELD OF THE INVENTION

The present invention relates to a service time estimation method for IT system resources. In particular, it relates to an estimation method based on clustering points and a visual mining technique.

BACKGROUND

As known, queuing network models are a powerful framework to study and predict the performance of computer systems, i.e. for capacity planning of the system. However, their parameterization is often a challenging task and it cannot be entirely automatically performed. The problem of estimating the parameters of queuing network models has been undertaken in a number of works in the prior art, in connection with IT systems and communication networks.

One of the most critical parameters is the service time of the system, which is the mean time required to process one request when no other requests are being processed by the system. Indeed, service time estimation is a building block in queuing network modeling, as diagrammatically shown in FIG. 1A.

To parameterize a queuing network model, service time must be provided for each combination of service station and workload class. Unfortunately, service time measurements are rarely available in real systems and obtaining them might require invasive techniques such as benchmarking, load testing, profiling, application instrumentation or kernel instrumentation. On the other hand, aggregate measurements such as the workload and the utilization are usually available.

According to the utilization law, the service time can be estimated from workload (=throughput of the system) and utilization using simple statistical techniques such as least squares regression. However, anomalous or discontinuous behaviour can occur during the observation period. For instance, hardware and software may be upgraded or subject to failure, reducing or increasing service time, and certain background tasks can affect the residual utilization. The system therefore has multiple working zones, each corresponding to a different regression model, which shall be correctly detected and taken into consideration. This task, according to the prior art, cannot be efficiently automatically performed.

Two examples of a poor detection of regression models is shown in FIGS. 1B and 1C: here the single regression line is not effectively and correctly representing the behaviour of sampled data from two IT systems.

The problem of simultaneously identifying the clustering of linearly related samples and the regression lines is known in literature as clusterwise linear regression (CWLR) or regression-wise clustering and is a particular case of model-based clustering. This problem has immense applications in areas like control systems, neural networks and medicine. This problem has already been addressed by using different techniques, but usually it requires some degree of manual intervention: i.e., human intelligence is required to detect at least the number of clusters within the dataset points and to supply the correct value of some parameters to the chosen algorithm.

An object of the present invention is hence to supply an enhanced method for estimating these regression models and correctly classifying observation samples according to the regression model that generated them, so as to correctly plan capacity and upgrading of the system.

In other words, given n observations of workload versus utilization of an IT system, it is required to identify the number k of significant clusters, the corresponding regression lines (service time and residual utilization), cluster membership and outliers. Based on this identification, estimation of the IT system behaviour over a wide range of workload and utilization can be inferred, so that automatic upgrading or allocation of hardware/software resources can be performed in the system.

However, the clustering results do not carry any time-related information, which is crucial to understanding the past history of the system and predicting how it will be able to handle future workloads. The ability to detect when the system changes from one configuration to another also allows the detection of performance-related issues, such as performance degradations or utilization spikes due to non-modeled workloads. Therefore, starting from an accurate clustering of the points, a timestamp analysis has to be performed.

The identification of multiple system configurations and their grounding into identifiable time-frames or recurring patterns can bring control of complex and dynamic environments to the capacity planner, easing the necessity to rely on external information, which is hard to obtain (for example deployment of an updated application) and a time-consuming activity.

SUMMARY OF THE INVENTION

The above object can be obtained through a method as defined in its essential terms in the attached claims.

In particular, a new method is provided that combines density-based clustering, clusterwise regression and a refinement procedure to identify the service time estimation followed by a visual mining technique to aid the administrator in tracking down performance degradation due to a software upgrade or deciding to modify the schedule of a maintenance operation.

While service time estimation according to the prior art considered the functional regression model, in which errors only affect the independent variable (the utilization), the method of the invention is based on the structural regression model, in which there is no distinction between dependent and independent variable. While it makes sense to consider the workload a controlled variable, using the structural model for regression is less prone to underestimating the service time when the model assumptions are not met. Results obtained with this method yield more accurate results than existing methods in many real-world scenarios.

Moreover, it shall be noted that according to the prior art, service time estimation is based on standard regression (executed on the vertical distance, i.e. along the ordinate axis) and utilization is considered the independent variable and the workload is assumed to be error-free: then, if this assumption does not hold, the estimator is biased and inconsistent. By contrast, according to the invention an orthogonal regression has been chosen, which proved to yield the best results on most performance data sets. This approach proved to be effective also because aggregate measurements are often used for workload and utilization: for example, if observation is done on a web server to get page visits versus CPU utilization
   not all pages count the same in terms of CPU utilization,
      even if there is no error in CPU utilization measurements,
         the data will not perfectly fit in a straight line,
      and this is due to different mixtures of page accesses during
         different observation periods.
According to the method of the invention, it has been chosen to leave occurrence of overestimation of the number of clusters, so as to rely on an automatic procedure, and reduce the number of clusters to the correct one through refinement procedure.

Once the clustering has been done, a visual mining technique is performed to bring out relationship between cluster membership and time-stamps. In particular, two different type of behaviors are mined in the data: those associated with sporadic configuration changes, which extend over a well-defined time frame and the ones composed of isolated, recurring observations. While the first system configurations are usually associated to software or hardware changes that alter the performance of the system, the second are commonly due to scheduled activities such as backup or replication. To deal with the uncertainty of assignment of points near the intersection of multiple regression lines, a filtering step is performed to improve the quality of the results by discarding observations that are likely to be ill assigned. Thanks to the information provided by our method, the system administrator might be able to track down performance degradation due to a software upgrade or decide to modify the schedule of a maintenance operation.

BRIEF DESCRIPTION OF THE DRAWINGS

Further features and advantages of the system according to the invention will in any case be more evident from the following detailed description of some preferred embodiments of the same, given by way of example and illustrated in the accompanying drawings, wherein:

FIG. 2 is representing the conversion of a dataset with rounded utilization into a plot of scattered data;

FIGS. 6A-6C are plots of clusters upon applying refinement procedure;

FIG. 13, is a table of generating the different test instances for comparing our approach with the best cluster algorithm;

FIG. 15, contains the results of the comparison of our approach with the best available clustering method.

DETAILED DESCRIPTION OF PREFERRED EMBODIMENT OF THE INVENTION

Figure 1A:
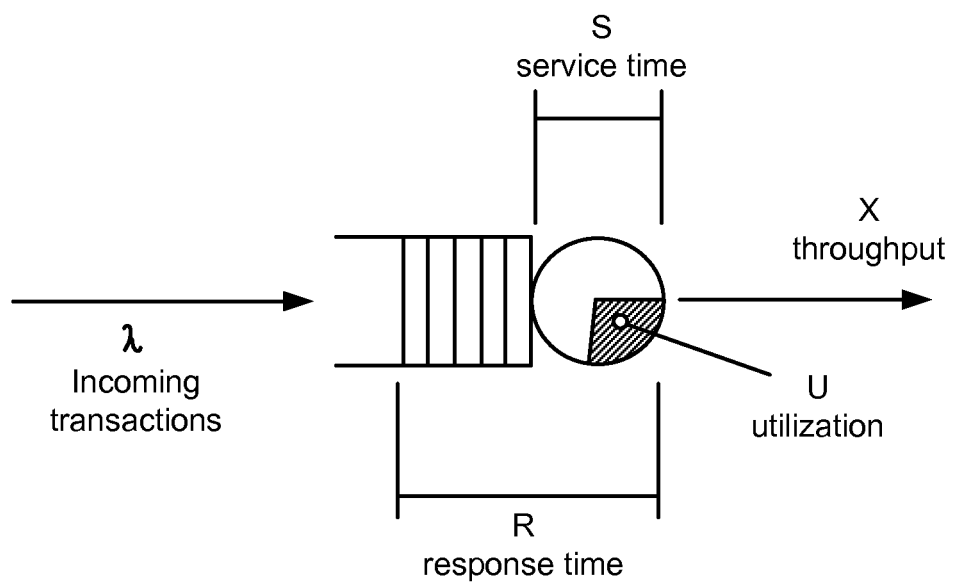
FIG. 1A is a diagram showing the concept of utilization law and service time in an IT system.
Figure 1B:
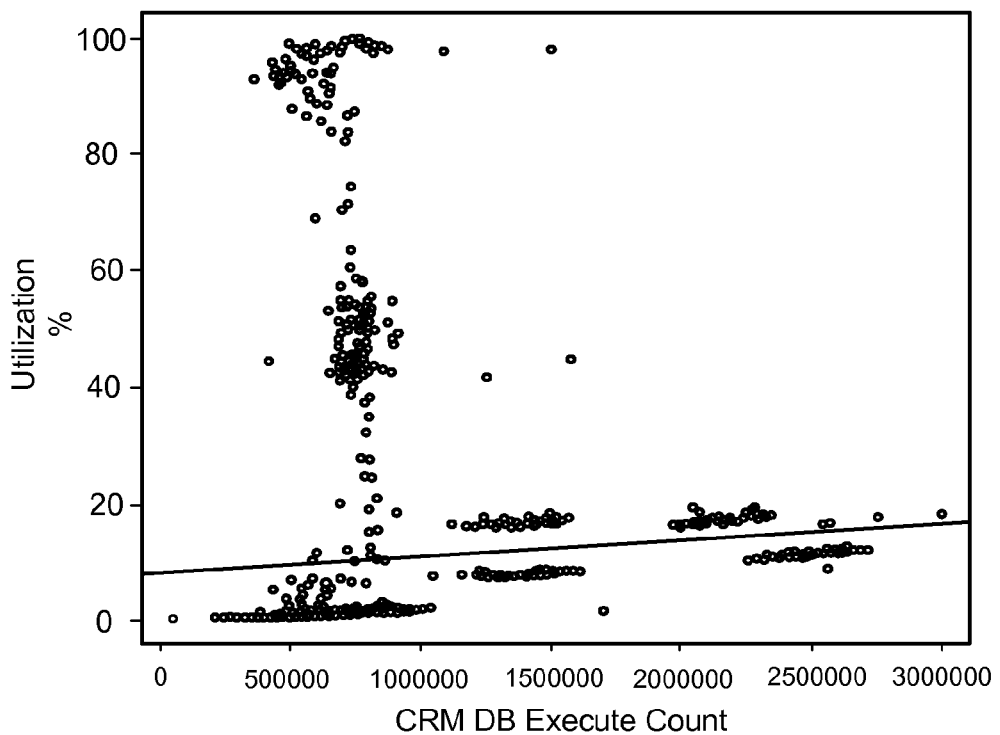
FIGS. 1B and 1C are exemplary plots of regression lines obtained according to the prior art.
Figure 1C:
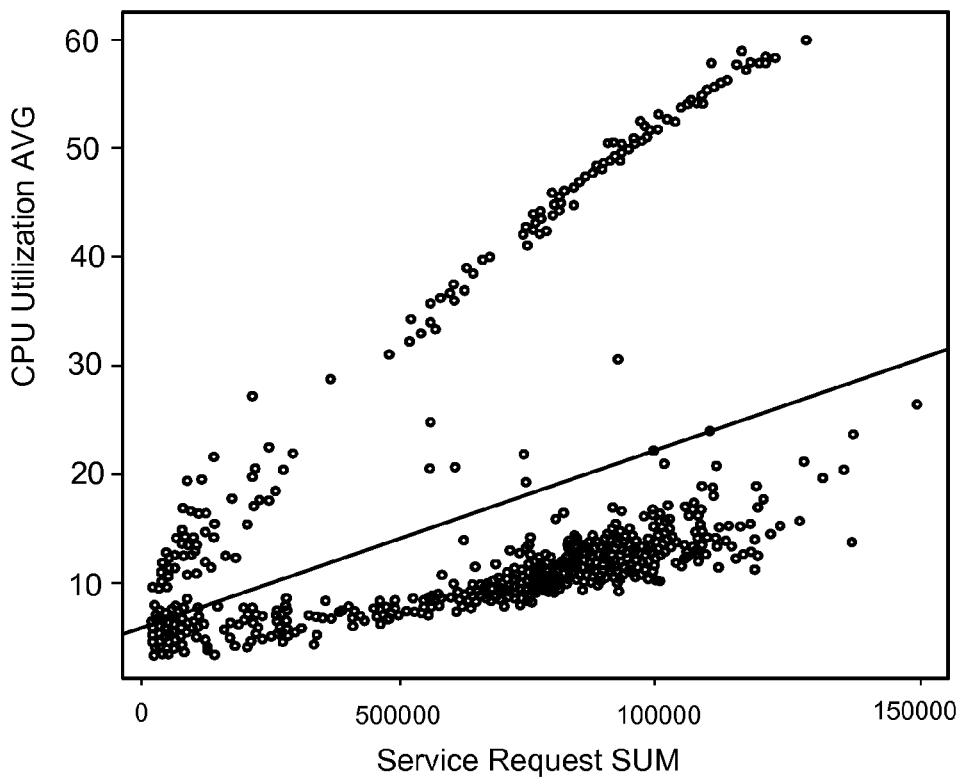

The utilization law states that U=XS, where X is the workload of the system, S is the service time and U is the utilization. According to the utilization law, when no requests are entering the system, utilization should be zero. This is not always the case, due to batch processes, operating system activities and non-modeled workload classes. Therefore, there is a residual utilization present. If we represent residual utilization with the constant term R, the utilization law becomes U=XS+R.

In other terms, utilization law is a an equation of a straight line where service time is the slope of a regression line and residual utilization (due to not modeled work) is the intercept of the regression line.

During an observation period, hardware and software upgrades may occur, causing a change in the service time. At the same time, background activities can affect the residual utilization. Therefore, the data is generated by $k \geq 1$ linear models:

$$U = XS1 + R1$$
$$U = XS2 + R2$$
$$\ldots$$
$$U = XSk + Rk$$

According to the invention, the error-in-variables (EV) model is assumed, therefore if we let $(X_1^*, U_1^*), (X_2^*, U_2^*), \ldots, (X_n^*, U_n^*)$ be the real values generated by the model, the observations $(X_i^*, U_i^*)$ are defined as $X_i = X_i^* + \eta_i$ and $U_i = X_i^* S + \epsilon_i$, where $\eta_i$ and $\epsilon_i$ are random variables representing the error. The choice of the EV model is motivated later on in the specification. Given the set of observation samples (affected by hardware/software upgrades, by background or batch activities and by outliers), the task is to simultaneously estimate the number of models k that generated the data, the model parameters $(S_j; R_j)$ for $j \times \{1, \ldots, k\}$ and a partition of the data $(C_1, \ldots, C_k$ where $C_j \top \{1, \ldots, n\}$, $|C_j| \geq 2$, $C_j w C_k = 0$ for $C_j \neq C_k$ and $C_1 \cup \ldots \cup C_k = \{1, 2, \ldots n\}$ such that the observations in cluster $C_j$ were generated by the model with parameters (Sj; Rj).

In other words, it is required to simultaneously estimate the regression lines (clusters) and cluster membership problem, which is known in literature as clusterwise regression problem.

A real dataset is given from sampling utilization versus workload in a IT system (for example a CPU of a computer). Said dataset is analyzed to obtain proper service time to be later used to trigger upgrading or allocation of hardware resources in the system. To this purpose, the following steps are performed on the dataset according to the method of the invention:

1. Normalize data
2. Scatter data if utilization has been rounded
3. Find density-based clusters (DBSCAN)
4. Discard clusters with less than the z % of the total number of observations 5. In each cluster, perform clusterwise regression and obtain sub-clusters
   reduce sub-clusters with refinement procedure
   update cluster list with the sub-clusters
6. Remove "globular cluster"
7. Reduce clusters with refinement procedure
8. Post-process shared points and outliers
9. De-normalize results (Renormalize regression coefficients)

Figure 3:
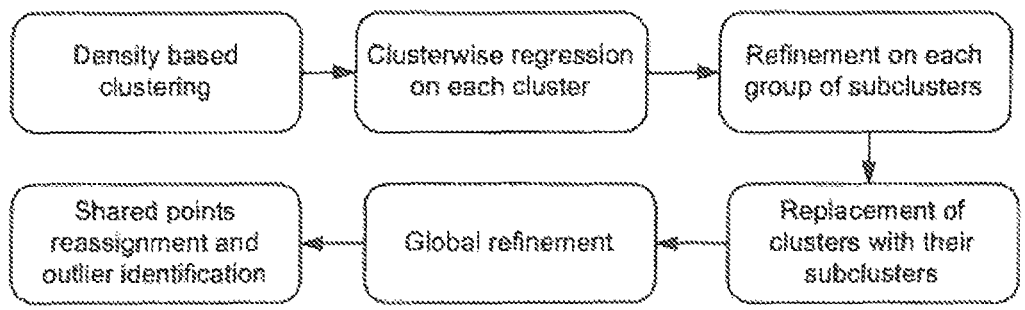
FIG. 3 is a flow chart showing the main steps of the method of the invention.

The method proposed according to the invention will be called RECRA (Refinement Enhanced Clusterwise Regression Algorithm). The general principle of this method is to obtain an initial partition of the data into clusters of arbitrary shape using a density based clustering algorithm. In the next step, each cluster is split into multiple linear subclusters by applying a CWLR algorithm. The number of subclusters is fixed a priori and should be an overestimate. A refinement procedure then removes the subclusters that fit to outliers and merges pairs of clusters that fit the same model. In the next step, the clusters are replaced by their subclusters and the refinement procedure is run on all the clusters, merging the ones that were split by the density-based clustering algorithm (see FIG. 3).

1. Normalize Data
   Data are normalized so as not to introduce further errors.
2. Scatter Data
   When utilization data have been rounded, scattering of the data is required to prevent existence of clusters of perfectly collinear points. For example, as seen in FIG. 2, integer CPU utilization has been rounded (left plot) and then value U is scattered using uniform [−0.5,0.5] noise (right plot): collinear sample points, due to the sampling methodology, can be hidden so as to prevent false determination of collinear clusters.
3. Find Density-Based Clustering (DBSCAN Application)
   An initial clustering partition is obtained through DBSCAN (Ester M., Kriegel H. P., Sander J., and Xu X. "A density-based algorithm for discovering clusters in large spatial databases with noise"), which is a well known clustering algorithm that relies on a density-based notion of clusters. Density-based clustering algorithms can successfully identify clusters of arbitrary shapes. The DBSCAN method requires two parameters: the minimum number of points and $\epsilon$, the size of the neighbourhood. The $\epsilon$ parameter is important to achieve a good clustering. A small value for this parameter leads to many clusters, while a larger values leads to less clusters. According to the prior art, it is suggested to visually inspect the curve of the sorted distances of the points to their k-neighbour (sorted k-distance) and choose the knee point of this curve as $\epsilon$. According to the invention, since the method shall be performed automatically, the 95-percentile of the sorted k-distance is picked.

The solution of picking up 0.95-quantile of the sorted k-distance works well on typical datasets sampled from IT systems; in any case, even when it doesn't work properly, the method of the invention provides for subsequent steps that adjust the result. In fact, if it is too big with respect to the theoric correct value, less clusters than desired are obtained and the clusterwise regression step will split them; if it is too small, more clusters than desired are obtained and a refinement procedure will merge them.

Applying density-based clustering at this stage of the method has two advantages:
   it reduces the complexity of the problem undertaken by the clusterwise regression technique (estimating regression lines in two small cluster is much easier than finding regression lines in two big clusters, since the scope of the search is restricted).
   it prevents too many regression lines to be produced on the same cluster.

This often happens when one of the clusters is very "thick" with respect to the others. Many regression lines will be used to minimize the error in the dense cluster and only one or few regression lines will be used to fit the other clusters, causing two or more clusters being fitted by the same regression line.

In some cases this density-based clustering step might separate the data produced by the same regression model in two clusters. This usually happens when the observations produced by the same regression model are centred around two different workload values. Unless the clusters are extremely sparse, these cases can be effectively addressed to in the following refinement step.

4. Discard Clusters
   Clusters having less than the z % of the total number of observations are discarded as not significant.
5. Perform Clusterwise Regression and Refinement
   During this step, a clusterwise regression algorithm is applied, with an overestimate of the number of clusters. Various algorithms can be used for the clusterwise regression step. According to a preferred embodiment of the invention, the VNS algorithm proposed in "Caporossi G. and Hansen P., Variable neighbourhood search for least squares clusterwise regression. Les Cahiers du GERAD, G-2005-61" is used. This method uses a variable neighbourhood search (VNS) as a meta-heuristic to solve the least squares clusterwise linear regression (CWLR); in particular, it is based on ordinary least squares regression. This method of performing regression is non-robust and requires the choice of an independent variable. Service time estimation in the prior art has considered the utilization as the independent variable, but if this assumption does not hold, the estimator is biased and inconsistent. Orthogonal regression, on the other hand, is based on an error-in-variables (EV) model, in which both variables considered are subject to error. Computational experiments made by the applicant have shown that orthogonal regression yields the best results on many performance data sets. This is understandable since it is often convenient to choose aggregate measurements to represent the workload. For example, in the context of web applications, the workload is often measured as the number of hits on the web server, making no distinction among different pages, despite the fact that different dynamic pages can have well-distinguished levels of CPU load. It is easy to see why, even if we assume the error in the measurement of utilization to be zero, the data will not be perfectly fit by a straight line, due to different mixtures of page accesses during different observation periods. The approximation done by choosing aggregate measurements for workload is taken into account by the EV model, but not by regular regression models. It is worth pointing out that in cases in which the assumption of having errors in both variables does not hold, regular regression techniques would provide better results. Because of this observation, according to the invention a modified VNS is used, using a regression method, which is robust and based on the errors-in-variables model, thus measuring orthogonal distances between the points and the regression lines. A preferred method is based on the methodology proposed in "Fekri M. and Ruiz-Gazen A. Robust weighted orthogonal regression in the errors-in-variables model, 88:89-108, 2004.", which describes a way of obtaining robust estimators for the orthogonal regression line (equivalent major axis or principal component) from robust estimators of location and scatter. The MCD estimator (Rouseeuw P. J. Least median of squares regression. Journal of the American Statistical Association, 79:871-881, 1984) is used for location and scatter, which only takes into account the h out of n observations whose covariance matrix has the minimum determinant (thus removing the effect of outliers). Preferably a fast version of this estimator (based on Rousseeuw P. J. and van Driessen K. A fast algorithm for the minimum covariance determinant estimator. Technometrics, 41:212-223, 1998.) is used and to ensure the performance of VNS a high value of h shall be set. The one step re-weighted estimates are computed using the Huber's discrepancy function (see Huber P. J. "Robust regression: asymptotics, conjectures and monte carlo", The Annals of Statistics, 1:799-821, 1973).

The VNS step of the method is working in the following manner. Given the number of clusters K, the K clusters whose regression lines provides the best fit of the data shall be found. Then convergence until a certain condition is met is followed through:

(i) local search:
If the error is smaller than previous best, the result is saved and perturbation intensity is set as p=1;
else, perturbation intensity is set as p=p % (K−1)+1
(ii) perturbation of the solution.

Local search is performed by reassigning sample points to the closest cluster (distance from the regression line), then computing regression lines and repeat the same procedure until no points are required to be moved and reassigned to a closer cluster.

Perturbation (also called "split" strategy), is performed by applying p times the following procedure:
take a random cluster and assign one of its points to another cluster
take another random cluster and split it in two randomly and perform local search.

Figure 4:
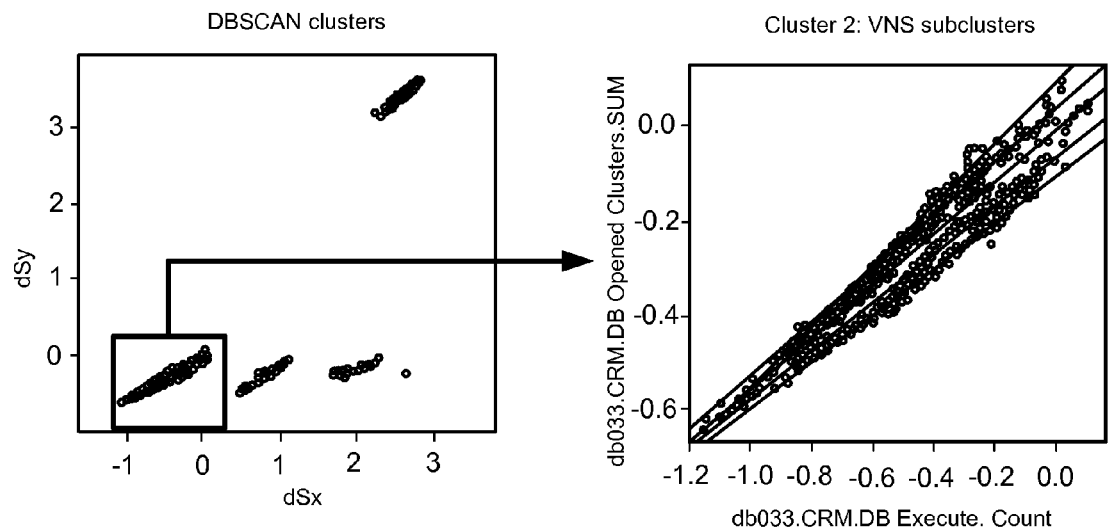
FIGS. 4 and 5 are exemplary plots of dataset after applying DBSCAN and VNS.
Figure 5:
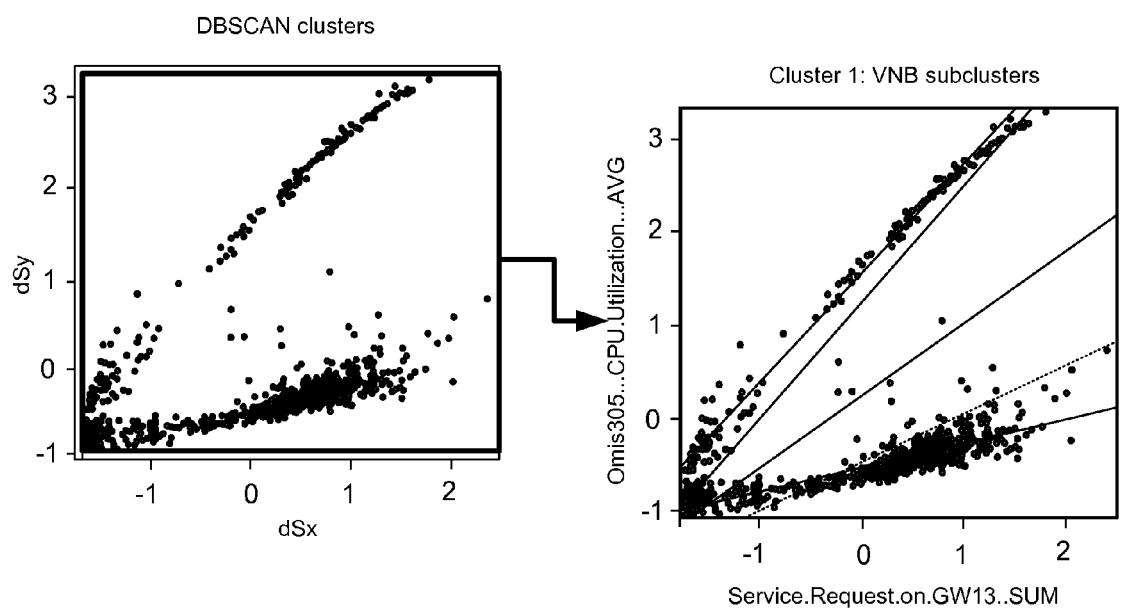

A typical result of this clusterwise regression procedure is shown in FIGS. 4 and 5, where five subclusters are identified in a given datasets.

Additionally, globular clusters shall be detected and removed, since "square" or "globular" clusters are not at all significant for the purpose of estimating the service time. This can be done according to two techniques.

A first mode provides to transform points of each cluster in such a way that the regression line corresponds to the abscissa axis (i.e. workload) of the plot. Then, the distance of the transformed points to the abscissa axis is computed and the q-quantile of the distribution of points on the x axis and on the y axis is considered: if it is smaller than a predetermined threshold, corresponding cluster points can be removed. A second mode provides to compute confidence interval of regression line: if it is above a predetermined threshold (or even if the sign of the slope is affected), then the corresponding cluster can be removed.

7. Refinement

A refinement procedure is performed for reducing the number of significant clusters; this step is carried out by removing or merging clusters by reassigning points to other clusters on the basis of some distance function, thereby reducing the number of clusters needed.

This procedure is run both during the central part of the method (as seen above), on sub-clusters right after clusterwise regression step—so as to reduce the number of sub-clusters overestimated by VNS—and on all clusters at the end of the estimate procedure—so as to merge clusters generated by the same linear model but separated by DBSCAN, because they are centred around different zones.

Applying the refinement in two phases reduces the number of pairs of clusters to be evaluated and also improves the chances that the correct pairs clusters are merged.

Refinement procedure is performed according to the following steps. It is assumed that 'delta' is the z-quantile of the orthogonal distances from the points of a cluster to its regression line; it is suggested to use value for z=0.9. Delta is computed for each cluster and then the pair that, when merged, gives origin to the cluster with the smallest increase in cluster delta is found.

Increase over the sum of deltas (see example of FIG. 6A),
Increase over the max delta (see example of FIG. 6B),
Increase over the max delta multiplied by the increase in the number of points (see example of FIG. 6C).

In, general, by merging a big cluster with a small cluster the increase is expected to be small, while merging two big clusters the increase can be big.

If the increase of delta is below a predetermined threshold, the pair of clusters can be merged and a new regression lines is computed and then this procedure is started again; otherwise the procedure is stopped.

Figure 7:
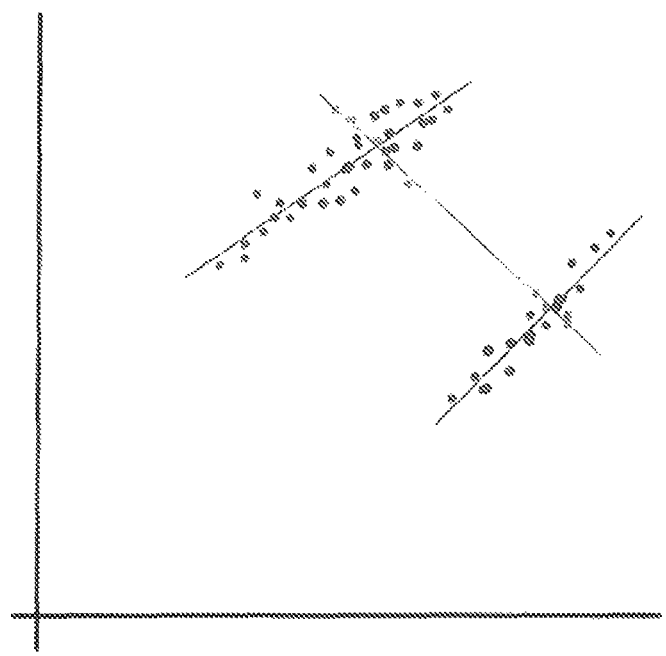
FIG. 7 is an exemplary plot of a dataset where three critical clusters are identified.

A typical situation which can be solved by a variant of refinement procedure is shown in FIG. 7, where no pair can be merged without causing a large increase in delta. This procedure is applied every time delta increase is too big.

Each cluster is evaluated. The points of one cluster are assigned to the other clusters and it is checked which cluster suffers the biggest delta increase. The procedure then find the cluster that, when removed (i.e., having its points assigned to other clusters), gives origin to the smallest max increase in delta (since the regression line can change a lot, a few steps of local search are also performed). If the delta increase is below a predetermined threshold, the cluster is actually removed and the procedure is repeated. Otherwise the procedure is stopped.

From a computational point of view, refinement procedure can be seen as follows.

Given a cluster $C_i$, the associated regression line defined by the coefficients $(R_i, S_i)$, and a point $(X_j, U_j)$, let $d(i,j)$ be the orthogonal distance of the point from the regression line. For each cluster $C_i$ the distances $d(i,j)$ for $j=1, \ldots, |C_i|$ can be considered a random sample from an unknown distribution. We call $\delta p(C_i)$ the p-percentile of this sample. A point j is considered inliner w.r.t. to a cluster if $d(i,j) < 1.5 \delta_{0.9}(C_i)$.

The refinement procedure works as follows.

1. For each cluster Ci from the smallest (in terms of point number) to the largest one
(a) If more than a certain percentage $T_i$ of its points are inliners w.r.t. other clusters or if less than $T_p$ points are not inliners w.r.t. other clusters, remove the cluster, reassign its points to the closest cluster and perform a local search.

2. Repeat
(a) For each pair of clusters $C_i, C_j$:
i. Merge the two clusters into a temporary cluster $C_{i,j}$.
ii. Remove from $C_{i,j}$ any point that is inliner w.r.t. some cluster $C_s$ with $s \neq i$ and $s \neq j$.
iii. Compute the regression line of $C_{i,j}$, $\delta_{0.9}(C_{i,j})$ and $\delta_{0.95}(C_{i,j})$.
iv. Let $C_{small}$ be the smallest cluster among $C_i$ and $C_j$.
v. If more than a certain percentage $T_o$ of the points of $C_{small}$ are outliers w.r.t. $C_{i,j}$, go to the next pair clusters.
vi. Compute the correlation $R_{ix}$ ($R_{jx}$) between the workload and the residuals of the points in $C_{i,j}$ w $C_i$ ($C_{i,j}$ w $C_j$).
vii. If $|R_{ix}| > T_R$ or $|R_{jx}| > T_R$, go to the next pair clusters.
viii. If the size of $C_{i,j}$ is less than Tp points, remove both $C_i$ and $C_j$, assign their points to the closest cluster and go to the next pair clusters.

ix. Compute $S_{0.9}(i, j) = \frac{\delta_{0.9}(C_{i,j})}{\delta_{0.9}(C_i) + \delta_{0.9}(C_j)}$ x. Compute $S_{0.95}(i, j) = \frac{\delta_{0.95}(C_{i,j})}{\delta_{0.9}(C_i) + \delta_{0.95}(C_j)}$ xi. If either $S_{0.9}(i, j)<T_\delta$ or $S_{0.95}(i, j)<T_\delta$ mark the pair as a candidate for merging. Store $C_{i,j}$, $S_{0.9}(i, j)$ and $S_{0.95}(i, j)$.

(b) If at least one pair is marked as a candidate for merging, select the pair of clusters $C_i, C_j$ for which $S_{0.9}(i, j)+S_{0.95}(i, j)$ is minimum and merge the two clusters. Points of $C_i$ or $C_j$ that do not belong to $C_{i,j}$ are assigned to the closest cluster. If no pair is marked as a candidate for merging, exit from the refinement procedure.

Summarizing the above refinement procedure, it can be inferred that the first part of the procedure deals with the removal of clusters that fit outliers from other clusters. This situation is frequent when overestimating the number of clusters. The second part of the procedure tackles the cases in which multiple regression lines fit the same cluster. This is also a common scenario.

The detection of such cases is based on the $\delta_{0.9}$ and $\delta_{0.95}$ values of the merged cluster and the ones of the clusters being merged. A decrease or even a small increase in these values suggests that the clusters are not well separated and should be merged. Two different values are used to improve the robustness of the approach. Considering these criteria is safe only when the two clusters being merged have similar sizes.

To avoid merging clusters that shouldn't be merged, two different conditions should be verified. The first one prevents a large cluster from being merged with a small cluster, which lies far away from its regression, requiring that at least a certain amount of points of the smallest cluster should be inlier in the merged cluster. The second condition is based on the correlation of residuals with the workload and preserves small clusters that are "attached" to big clusters but have a significantly different slope.

Figure 8:
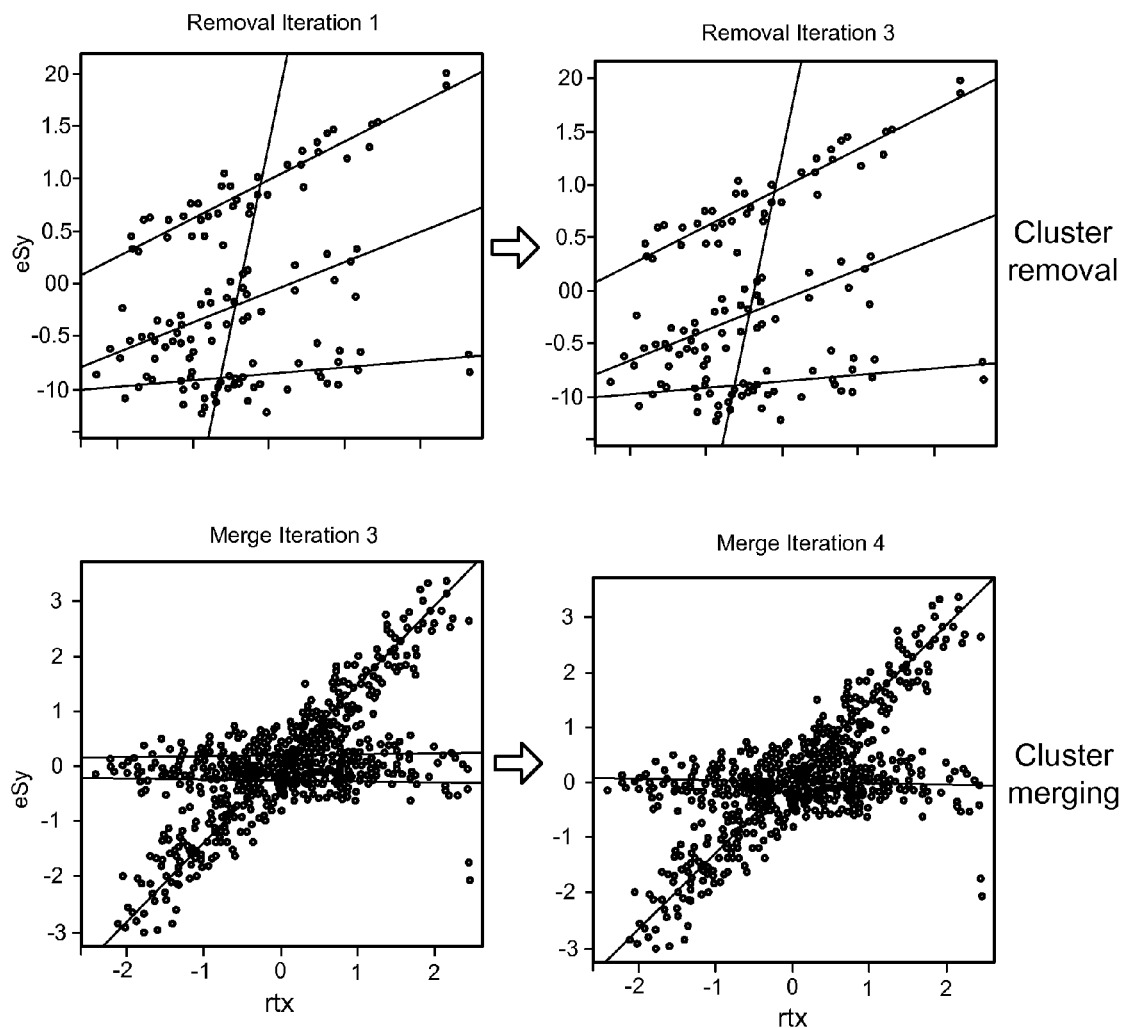
FIG. 8 are plots of different datasets showing the difference between cluster removal and cluster merging under the refinement procedure.

Examples of merging and removal of clusters are shown in FIG. 8.

8. Post-Process Shared Points and Outliers
9. De-Normalize Results (Renormalize Regression Coefficients).

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

8. Some Results for Point 8

To have an algorithm adaptable in a business setting, we have compared our approach to existing cluster-wise algorithms. We present the results obtained from our method versus the best such algorithm. Having done extensive testing on other algorithms, we have found that the best existing method is the Linear Grouping Algorithm presented in (Van Aeist A., Wang X. S. and Zamar R. H., and Zhu R. Linear grouping using orthogonal regression. Computational Statistics & Data Analysis, 50:1287{1312, 2006) with the gap statistic (Tibshirani R., Walther G., and Hastie T. Estimating the number of clusters in a data set via the gap statistic. Journal of the Royal Statistics Society.

Series B: Statistical Methodology, 63:411{423, 2001) to estimate the number of clusters.

Our algorithm is configured as follows. The minimum number of points for DBSCAN is set to 10 and the 95-percentile of the sorted 10-distance is chosen as the parameter. The exit condition for VNS and local search is set to 10 iterations without improvement. To compute the robust regression estimates, the FastMCD algorithm is configured to use 90% of the points and the number of samples is set to 50. The parameters of the refinement procedure are: $T_f=0.8$, $T_o=0.5$, $T_\delta=1.05$, $T_p=10$ and $T_R=0.9$.

For the LGA, the number of restarts is chosen in such a way to have 95% probability of having a "good start" under the assumption of equally-sized clusters.

The depth of the local search is set to 10 iterations as suggested in (Van Aelst A., Wang X. S. and Zamar R. H., and Zhu R. Linear grouping using orthogonal regression. Computational Statistics & Data Analysis, 50:1287{1312, 2006). The number of bootstraps for the computation of the gap statistic is set to 20 and the upper bound on the number of clusters is set to 5.

Since both our method and the LGA are based on the EV model, we generate data with error on both the variables. We do not compare with other methods that require the choice of an independent, error-free variable.

Figure 14:
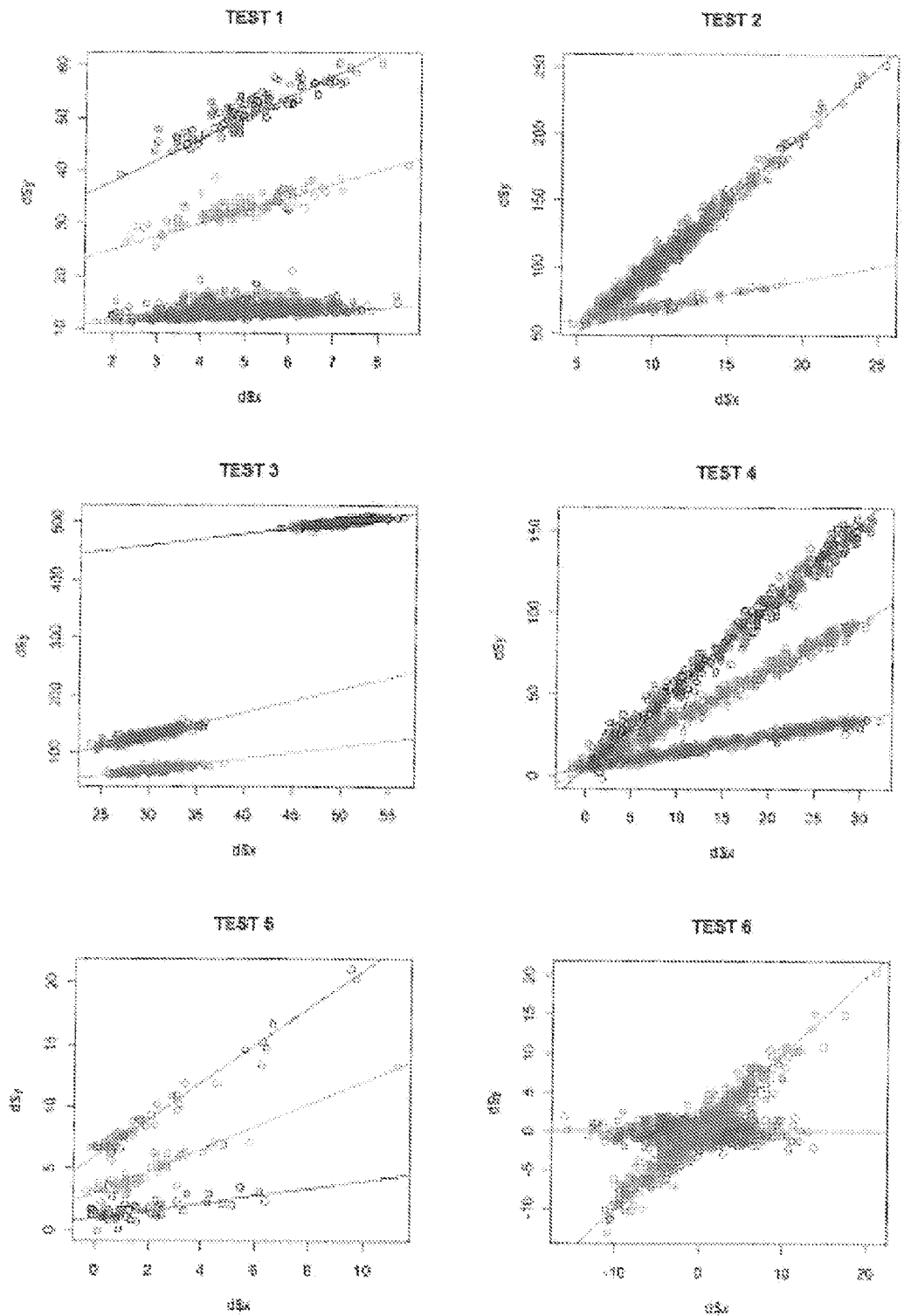
FIG. 14, contains pictorial representations of data sets generated in FIG. 13, which cover the type of data that arise.

The data is generated as described in FIG. 13. The configurations represent several realistic scenarios occurring in workload data. We have tested with many test cases and these were some of the most representative scenarios shown in FIG. 14. The $\epsilon$ and $\eta$ columns describe the distributions of the error on X and U, respectively. Different error distributions as well as different configurations of the regression lines are tested. We use the following distributions: Gaussian (N), chi-square $\chi^2$, exponential (Exp), uniform (U) and Student's t (t). In all test cases, two or three clusters were generated. Test cases 1 and 2 have clusters of different cardinality. Test case 1 represents three well-separated clusters. Test case 2 consists of two connected clusters of different sizes starting from the origin. Test cases 3, 4, 5 and 6 have equally-sized clusters. In test case 3, three very distant clusters with different sizes and placements are represented. Test case 4 shows three clusters starting from the origin. In test case 5 three very sparse clusters are represented. Two clusters overlapping in the middle are generated in test case 6. The last two test cases closely resemble two of the data sets used by the authors of the LGA. Examples of generated data sets are shown in FIG. 14. The error on the X values is gaussian distributed in all test cases, while U is affected by an asymmetric error distribution in the first test case and a heavy-tailed symmetric distribution in the third and fourth test cases. The simulation consists of 50 iterations for each test case. At each iteration, the data is generated anew. We measure the frequency with which the correct number of clusters k is estimated. For the iterations in which k is estimated correctly, we also evaluate the quality of the service time estimation as follows:

$$q_s = \min_{p \in P(k)} \frac{\sum_{i=1}^{k} |\vec{i} \cdot \vec{j}|}{k},$$

Where P(k) is the set if the possible permutations of k elements, p(i) returns the i-th value in the permutation p and $\vec{i}$, $\vec{j}$ are the 4 vectors of the two models i and j=p(i).

The results for the simulation are given in table 15, where HLC is our method. For each of six test cases, for each algorithm, the number of times k was correctly selected and the mean value of qS are given. Looking at the results, it is seen that in all the given test cases our algorithm outperforms the LGA, outputting the correct number of clusters and providing good estimates of the slopes. Test case 5 turned out—not surprisingly—to be the most challenging. When the results were unexpected, it was always due to the density-based clustering step, which separates linear clusters into multiple clusters.

In the first test case, the inaccuracy of the slope estimates obtained by the LGA is likely due to the combined effect of the distribution of the error and the difference in the cardinality of the clusters, which leads to fitting the data with two almost vertical lines. The density based step of our algorithm prevents such situations. In the second test case, the gap statistics tend to overestimate the number of clusters, partially due to the fact the assumption of equally-sized clusters is not verified. However, even in the other test cases, where the clusters have the same cardinality, the LGA method proves to be less reliable than our method.

The gap statistic performs poorly in test case 3, since it always identifies the number of clusters to be one, whereas the HLC algorithm identifies the correct k in all the runs of the simulation. In test cases 4 and 5, the LGA selects only one cluster respectively 8% and 88% of the times, while our method performs very well, yielding the correct number of clusters the vast majority of times. In test case 6, the results obtained by the two algorithms are comparable and the slightly better performance of our method is due to the final post-processing step of the algorithm, which recomputes the regression lines while ignoring the shared points. In this test case, a wrong assignment of the shared points can result in bad estimates of the slopes due to the fact that the majority of points of the two clusters are within the shared region. We observe that even when the error is normally distributed (test cases 2, 5 and 6) and therefore no outliers are present, our method still outperforms the LGA.

9. Time Stamp Analysis—Visual Mining

The clustering result is crisp, and each point is assigned to at most one cluster. Some observations are very close to the cluster that they are assigned to and very well separated from the other cluster centres. We refer to these observations as strongly-assigned points. Other observations do not have this property and might lie close to multiple cluster centres. We refer to these other observations as weakly-assigned points. In a noisy dataset, the closest cluster does not necessarily correspond to the linear model that generated a weakly-assigned point, since the assignment of such a point is very sensitive to the amount of error. To prevent ill-assigned points from affecting the quality of the timestamp analysis, we need a quantity that indicates the strength of cluster membership for each point. To measure this, we compute the silhouette value given in (Rousseeuw P. J. Silhouettes: A graphical aid to the interpretation and validation of cluster analysis. Journal of Computational and Applied Mathematics, 20:53{65, 1987.) of each point:

$$s(i) = \frac{b(i) - a(i)}{\max(b(i), a(i))}$$

where b(i) is the distance of the observation from the cluster $v_i$ and a(i) is the distance of the observation from the closest cluster other than $v_i$. The closer s(i) is to one, the stronger is the assignment. The closer s(i) is to zero, the weaker is the assignment. Observations with a silhouette value below a certain threshold $T_s$ are discarded. The choice of the threshold is assisted by the charts.

To assist the user in understanding the system behavior during the observation period, our algorithm automatically outputs multiple graphs.

The Silhouette-Time Chart (STC) represents the relationship between cluster membership and absolute time. It is a 2D scatter plot in which each observation is represented by the point (Ti; s(i)). The observations that are assigned to the same cluster have the same colour. The STC assists the choice of the silhouette threshold.

The Cardinality-Time Chart (CTC) represents how the cardinality of the clusters grows with time. It is composed of stacked dot plots corresponding to the different clusters. The dots represent the cluster cardinality, while the horizontal axis is the absolute time. This chart allows the user to easily distinguish clusters that correspond to periodic behaviours of the system and clusters that correspond to a certain period of time. For each cluster j, the cardinality at time Ti is computed as $c_j(\hat{i}) = \Sigma_{i \le i \le i, x(\hat{i}) \ge T_s} u[i, j]$.

Most computer systems are used to support human activities, so it is not surprising that most periodic behaviour occurs either daily or weekly. The following type of charts allow the identification of such behaviour:

The Hour of day Chart (DC) is a stacked bar plot that represents how many observations belong to each cluster for each hour of the day. If a particular behaviour of the system such as a background activity takes place at a certain hour, the corresponding bar will be dominated by observations that belong to the cluster corresponding to this working zone. The size of the bar for the cluster j at hour $\hat{p}$ is $|\{i \in C_j : h(T_i) = \hat{p}\}|$.

The Day of week Chart (WC) is a stacked bar plot that represents how many observations belong to each cluster for each day of the week. The size of the bar for the cluster j at hour $\hat{q}$ is $|\{i \in C_j : w(T_i) = \hat{q}\}|$.

Finally, some behaviour might occur only at a certain hour of a specific day of the week. To deal with this situation, we present the Timetable Chart (TC), which is composed of a grid, each cell corresponding to a specific hour of the day and day of the week. Each cell takes the colour of the cluster that has the most observations in that cell. The colour will be blended with white according to how dominant the cluster is in the cell. The dominant cluster in the cell that corresponds to hour $\hat{p}$ and day of the week $\hat{q}$ is $C_{\hat{j}}$ such that $$\hat{j} = \operatorname*{argmax}_{j \in 1, \ldots, k} |\{i \in C_j : h(T_i) = \hat{p}, w(T_i) = \hat{q}\}|.$$

10. Some Results for Point 9

Figure 9:
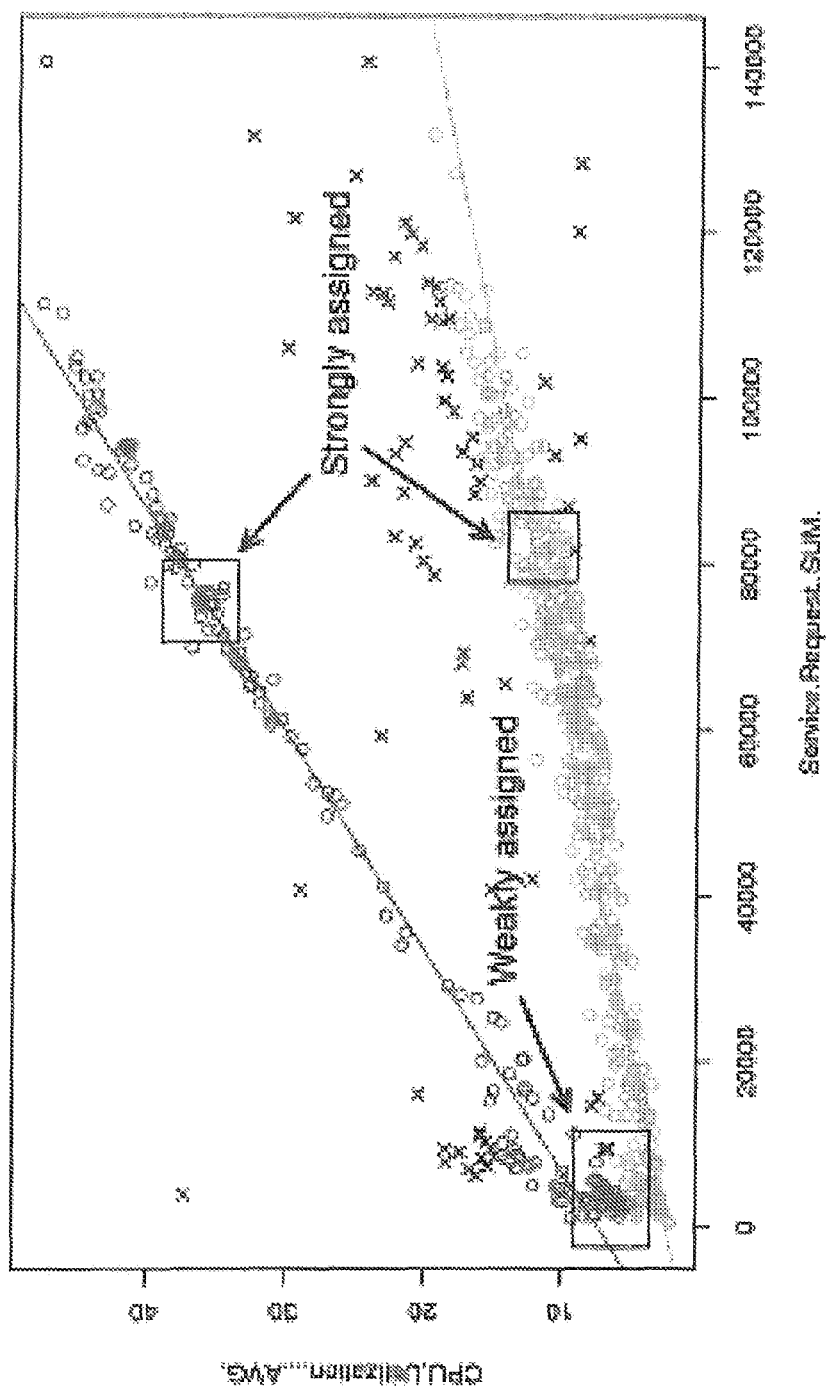
FIG. 9 is a plot explaining our concept of strongly and weakly assigned observations.
Figure 10:
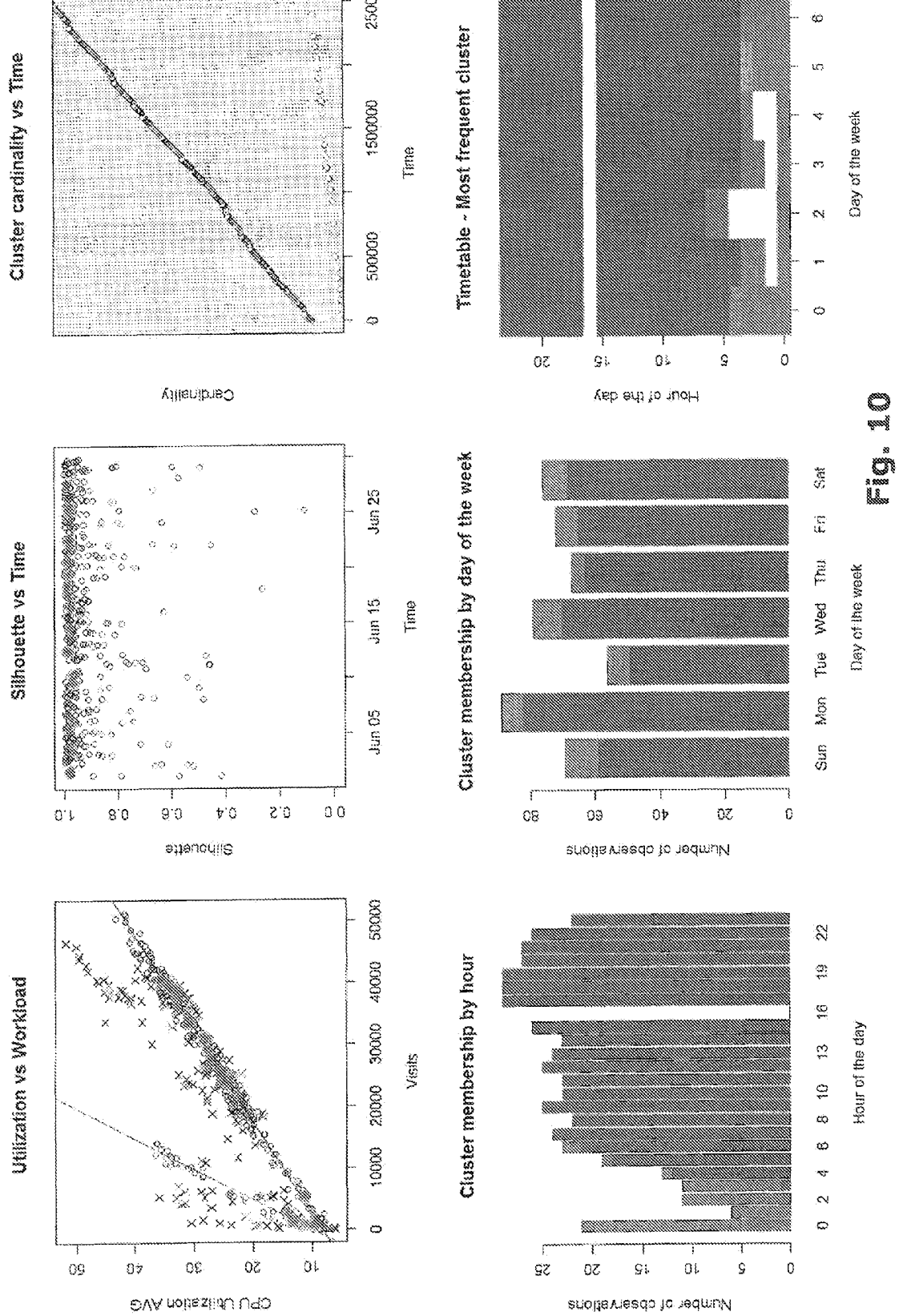
FIGS. 10, 11, 12 are plots of different datasets showing the entire effect of the algorithm with the result of the cluster algorithm with the STC, CTC, DC, WC and TC charts.

In this section we present the results obtained by our visual mining techniques on three real-world datasets. For each dataset, six different charts are represented in a 2×6 grid. In the top left, the result of the clustering algorithm is shown. The black points are marked as outliers, while the other colours represents the clusters. On the same row, from left to right, the STC and CTC are provided. Below, the DC, WC and TC are shown. The silhouette threshold ST is set to 0:8. The first two datasets are represented in FIGS. 9 and 10.

Looking at the spread of points and the clusters obtained in the utilization versus workload chart, the first two datasets look very similar. In both instances, clustering algorithm identifies two regression lines crossing near the origin. The STC shows that in both datasets there is a considerable amount of weakly-assigned points, which are trimmed when applying the silhouette Filtering. Despite the apparent similarities between in the data, the timestamp-based visual-mining techniques highlight that the behaviour of the system is significantly different.

The CTC of the first dataset shows that the red cluster represents the normal behaviour of the system, while the green cluster seems to represent a periodic behaviour. The DC makes clear that the green cluster corresponds to a behaviour that manifests itself during the night, from 0 AM to 4 AM.

Analysing the STC of the second dataset, it is observed that almost all the observations of the red cluster take place during a well-defined time frame, while the points of the green cluster are completely absent in that time span, implying that the red cluster represents a sporadic change of configuration. Accordingly, the DC, WC and TC do not show any kind of periodic behaviour.

Figure 11:
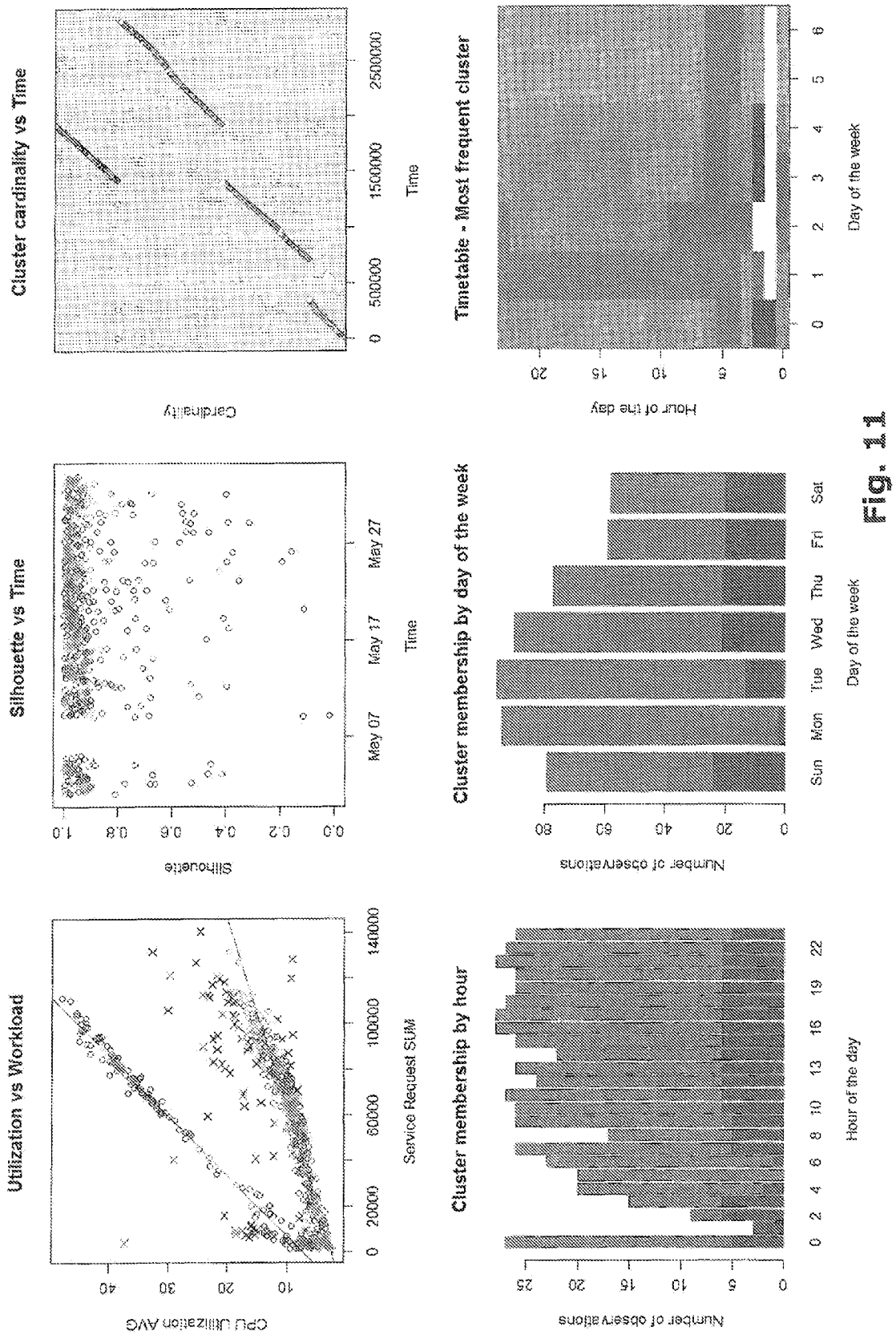
Figure 12:
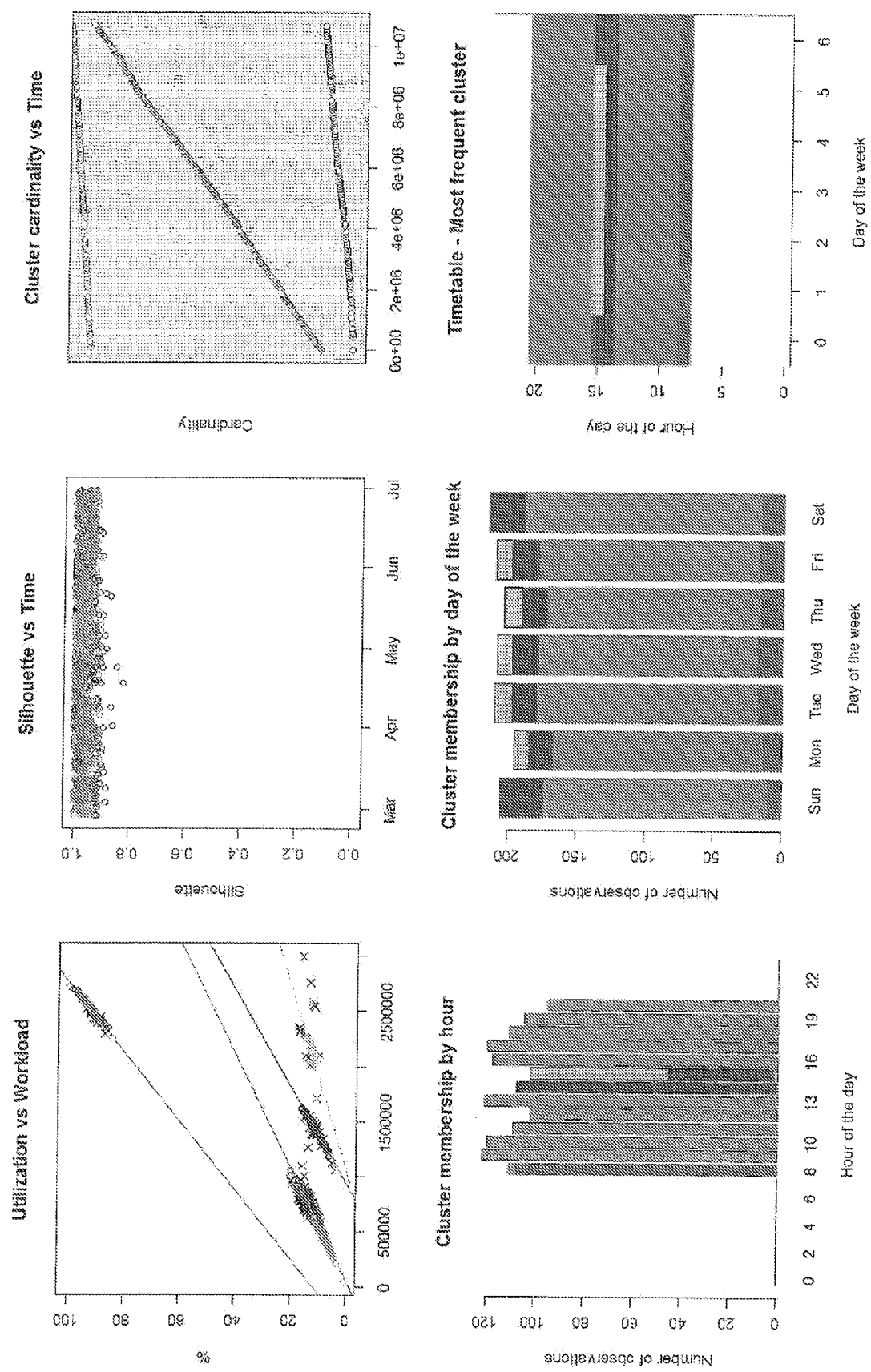

The third dataset is represented in FIG. 11. The data has been partitioned by REHCA into four well-separated clusters. As a consequence, the SC is very compact and almost all silhouette values are above the threshold. According to the CTC, all clusters manifest some sort of periodic behaviour. The light blue cluster, however, seems to momentarily stop at a certain point in time. The DC highlights that the red cluster is due to a periodic behaviour that happens every day at 8 AM and the phenomenon represented by the blue clusters takes place daily at 2-3 PM. The meaning of the light blue cluster is explained by the TC, in which it is clear that the corresponding configuration is active at 3 PM from Monday to Friday.

The invention claimed is:

1. A method for upgrading or allocating resources, the method comprising:
    collecting, by least at least one processor, a dataset by sampling utilization versus workload of resources in an Information Technology (IT) computer system, the resources of the IT computer system including hardware and software IT resources, the dataset including aggregate measurements of workload and utilization over time;
    analyzing, by the least one processor, the collected dataset to obtain a service time estimation using a refinement enhanced clusterwise regression process, the service time estimation being a parameter relating to an estimated time required to process a request by the IT computer system, the refinement enhanced clusterwise regression process including:
        normalizing, by the least one processor, the collected dataset;
        scattering, by the least one processor, data from the normalized dataset;
        obtaining, by the least one processor, a plurality of clusters based on the scattered data;
        discarding, by the least one processor, one or more clusters from the plurality of clusters with less than a percentage of a total number of observations;
        in each cluster, performing, by the least one processor, clusterwise regression and obtaining linear sub-clusters in a defined number;
        reducing, by the least one processor, one or more sub-clusters including applying a refinement procedure, removing one or more sub-clusters that fit to outliers and merging pairs of clusters that fit an equivalent model;
        updating, by the least one processor, one or more clusters with the reduced sub-clusters;
        removing, by the least one processor, one or more globular clusters;
        reducing, by the least one processor, a number of clusters with the refinement procedure; and
        de-normalizing, by the least one processor, data of the reduced number of clusters, wherein the service time estimation is computed from a slope of a regression line of a given cluster in the reduced number of clusters; and
    upgrading or allocating at least a portion of the resources of the IT computer system based on the service time estimation.

2. The method of claim 1, wherein the refinement procedure includes a merging step, wherein a delta is computed for each cluster and then a pair that, when merged, gives origin to the cluster with a smallest increase in cluster delta is found, then
    if the increase of the delta is below a threshold, the pair of clusters is merged and one or more new regression lines is computed and then the refinement procedure is started again, otherwise the merging step is ended.

3. The method of claim 2, wherein the refinement procedure provides that,
    given a cluster $C_1$, an associated regression line defined by coefficients $(R_i, S_j)$, and a point $(X_j, U_j)$, let $d(i,j)$ be the orthogonal distance of the point from the regression line, the following steps are performed,
    for each cluster $C_i$ the distances $d(i,j)$ for $j=1, |C_i|$ is computed and considered a random sample from an unknown distribution, and
    assuming $\delta\rho(C_i)$ the p-percentile of said sample, a point j is considered inliner with respect to a cluster if $d(i,j)<1.5\delta_{0.9}(C_i)$, then
    if more than a certain percentage $T_i$ of the points of the cluster are inliners with respect to other clusters or if less than $T_p$ points are not inliners with respect to other clusters, the cluster is removed, its points reassigned to the closest cluster and a local search is performed.

4. The method of claim 2, wherein the refinement procedure provides
    assigning the points of one cluster to other clusters and checking which cluster suffers the biggest delta increase, then finding the cluster that, when having all its points assigned to other clusters, gives origin to the smallest max increase in delta, then
    if delta increase is below a predetermined threshold, said cluster is actually removed.

5. The method of claim 1, further comprising a visual mining procedure including:
    calculating a silhouette value for each point to measure strength of point to cluster membership;
    choosing a value for a threshold; and
    outputting at least one chart.

6. The method of claim 1, wherein the at least one chart includes a silhouette-time chart, a cardinality-time chart, a parameter-time chart, an hour of day chart, a day of week chart, and a timetable chart.

7. A non-transitory computer readable medium including executable instructions that when executed cause at least one processor to:
    collect a dataset by sampling utilization versus workload of resources in an Information Technology (IT) computer system, the resources of the IT computer system including hardware and software IT resources, the dataset including aggregate measurements of workload and utilization over time;

analyze the collected dataset to obtain a service time estimation using a refinement enhanced clusterwise regression process, the service time estimation being a parameter relating to an estimated time required to process a request by the IT computer system, the refinement enhanced clusterwise regression process including:

normalize the collected dataset;

scatter data from the normalized dataset;

obtain a plurality of clusters based on the scattered data;

discard one or more clusters from the plurality of clusters with less than a percentage of a total number of observations;

in each cluster, perform clusterwise regression and obtaining linear sub-clusters in a defined number;

reduce one or more sub-clusters including applying a refinement procedure, removing one or more sub-clusters that fit to outliers and merging pairs of clusters that fit an equivalent model;

update one or more clusters with the reduced sub-clusters;

remove one or more globular clusters;

reduce a number of clusters with the refinement procedure; and de-normalize data of the reduced number of clusters, wherein the service time estimation is computed from a slope of a regression line of a given cluster in the reduced number of clusters; and upgrading or allocating at least a portion of the resources of the IT computer system based on the service time estimation.

8. The non-transitory computer readable medium of claim 7, wherein the refinement procedure includes a merging step, wherein a delta is computed for each cluster and then a pair that, when merged, gives origin to the cluster with a smallest increase in cluster delta is found, then if the increase of the delta is below a threshold, the pair of clusters is merged and one or more new regression lines is computed and then the refinement procedure is started again, otherwise the merging step is ended.

9. The non-transitory computer readable medium of claim 7, wherein the executable instructions cause the at least one processor to:

calculate a silhouette value for each point to measure strength of point to cluster membership;

choose a value for a threshold; and output at least one chart.

10. The non-transitory computer readable medium of claim 9, wherein the at least one chart includes a silhouette-time chart, a cardinality-time chart, a parameter-time chart, an hour of day chart, a day of week chart, and a timetable chart.

* * * * *